Figure 1:
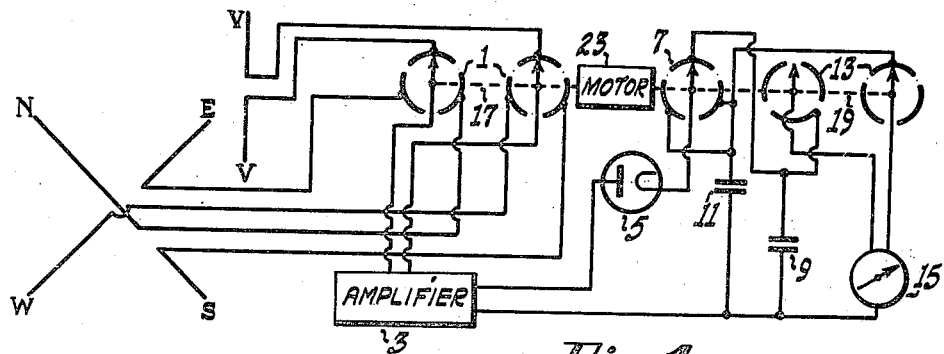

June 10, 1947. D. G. C. LUCK 2,422,108
RADIO DIRECTION FINDING
Filed Aug. 31, 1942 2 Sheets-Sheet 1

Inventor
DAVID G. C. LUCK
By C. Q. Puska
Attorney

June 10, 1947. D. G. C. LUCK 2,422,108
RADIO DIRECTION FINDING
Filed Aug. 31, 1942 2 Sheets-Sheet 2

Inventor
DAVID G.C.LUCK
Attorney

Patented June 10, 1947

2,422,108

UNITED STATES PATENT OFFICE 2,422,108

RADIO DIRECTION FINDING

David G. C. Luck, Merchantville, N. J., assignor to Radio Corporation of America, a corporation of Delaware Application August 31, 1942, Serial No. 456,764

8 Claims. (Cl. 250—11)

This invention relates to radio direction finding, and more particularly to systems for providing a warning of the incidence of waves unsuitable for the purpose of direction finding. Waves arriving at a direction finder from high angular elevations are known to produce unreliable bearing indications. This is also true of waves polarized so that they are not efficiently picked up by the antennas of a direction finder; the individual antenna itself may be totally unresponsive to, for example, horizontally polarized waves, but stray pickup of horizontal electric field components may occur in the connecting leads or shields, or in some other manner, inducing voltages in the system which give rise to spurious bearing indications. Thus in the case of a direction finder using antennas which are individually non-responsive to horizontally polarized waves, the ratio of the horizontal electric component to the vertical electric component of a radiation field is a measure of the probability that the bearings taken on that field will be in error.

A warning system operating by the comparison of the output of a single antenna with that of a phased pair of antennas of different directivity is described in application Serial No. 432,370, filed February 26, 1942, by D. G. C. Luck. While the three mutually orthogonal magnetic or electric dipole antennas of said system are between them capable of receiving effectively any type of wave, the connection of two of them together through a phasing network sacrifices this property, and results in lack of response to certain types of waves. In general, every single antenna or system of antennas connected together through phasing networks produces no response to waves arriving from any specific direction with one particular polarization. For example, vertically downcoming waves, if circularly polarized in a sense opposite to the sense of the phase rotation of the interconnected antennas, of a turnstile system can produce no overall response in the output circuit of those antennas. This is also true of elliptically polarized waves arriving at an elevation such that the projection of the ellipse of polarization upon the plane of the antenna array is a circle with the above sense of rotation. Thus the above described system will fail to give warning under such conditions.

Accordingly, it is an object of the present invention to provide an improved warning system wherein the outputs of these mutually orthogonally disposed antennas, acting individually, are compared to determine the ratio of the amplitudes of desired and undesired field components.

Another object is to provide an improved method of and means for indicating automatically the ratio of the horizontal component to the vertical component of the electric or of the magnetic vector of a radiation field.

A further object is to provide an improved method of and means for combining the effects of a plurality of differently directive antennas to provide a response which is a function of the individual absolute values, rather than of a resultant of the complex or vectorial values, of their outputs.

Figure 2:
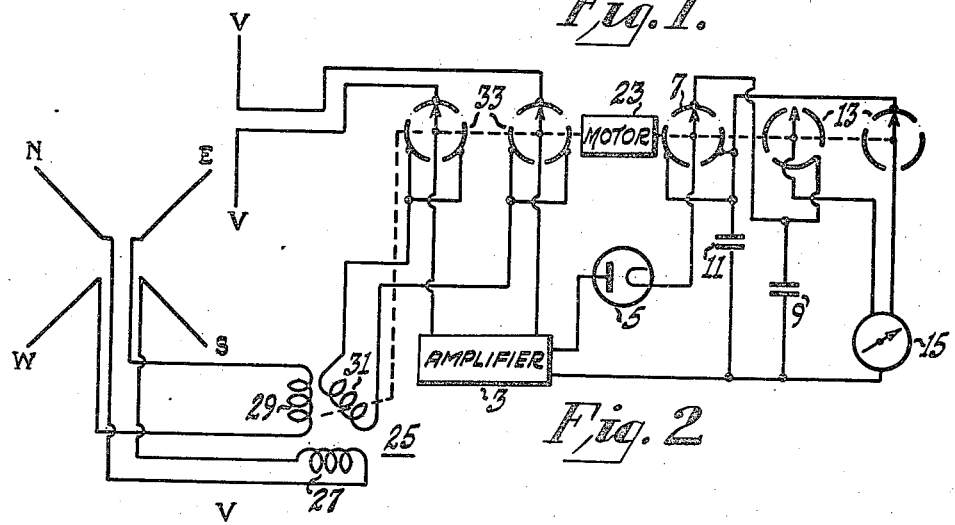
Figure 3:
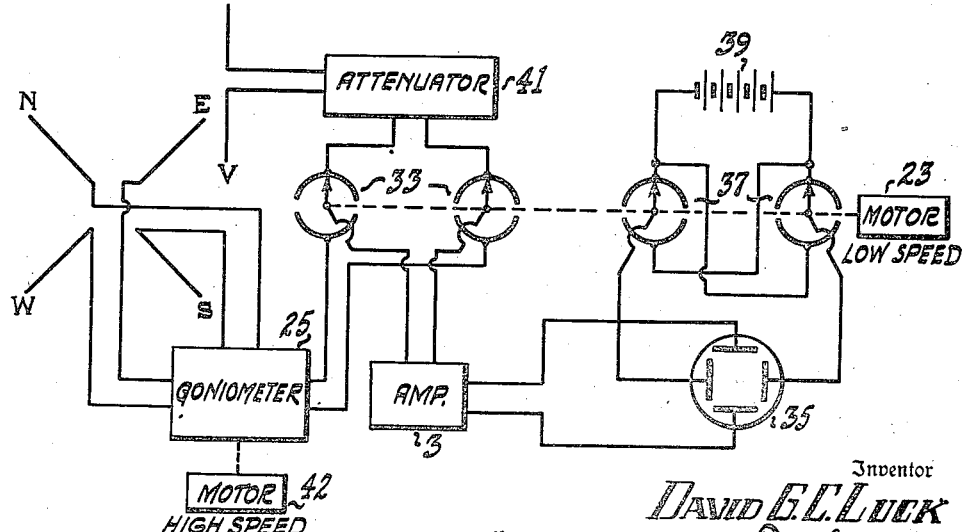
Figures 4, 5, 6, 7, 8:
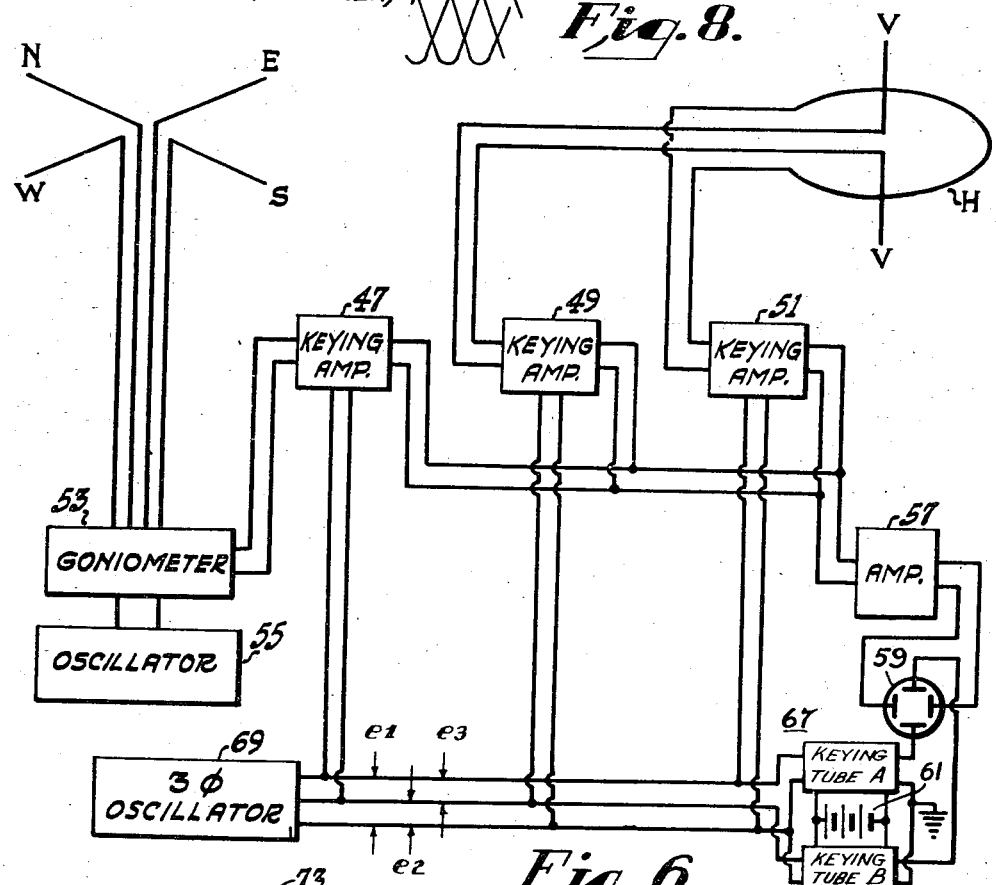

These and other and incidental objects will become apparent to those skilled in the art upon consideration of the following description, with reference to the accompanying drawing, in which Fig. 1 is a schematic diagram of one embodiment of the invention, Fig. 2 is a schematic diagram of a modification of Fig. 1, Fig. 3 is a further modification of Fig. 1, Fig. 4 is an illustration of the type of indication afforded by the system of Fig. 3, Fig. 5 is a schematic perspective of an alternative antenna array for use with the systems of Figs. 1, 2 and 3, Fig. 6 is a schematic block diagram of a further modification, Fig. 7 is an illustration of a typical indication provided by the system of Fig. 6, and Fig. 8 is a graph illustrating certain voltages generated in the operation of the system of Fig. 6.

Referring to Fig. 1, a pair of dipoles N—S and E—W are arranged horizontally at right angles to each other, and a third dipole V—V is arranged in a vertical position. The three dipoles are connected to a switch 1 in the input circuit of a radio frequency amplifier 3. The output of the amplifier 3 is connected through a rectifier 5 to a second switch 7 and hence to a pair of capacitors 9 and 11. A third switch 13 is arranged to connect the capacitors 9 and 11 alternately to the corresponding input terminals of a crossed coil ratio meter 15. The switches 1, 7 and 13 are mechanically ganged to operate together as schematically indicated by the dashed lines 17 and 19. A motor 23 is provided to operate the switches to change periodically the connection between the various elements, as described hereinafter.

The operation of the system of Fig. 1 is as follows: The switch 1 is actuated cyclically by the motor 23 to connect successively the vertical antenna V—V, the horizontal dipole N—S, and the horizontal dipole E—W to the input of the amplifier 3. During the time when the vertical dipole V—V is connected to the input of the amplifier 3, the condenser 9 is connected to the output circuit, and is charged through the rectifier 5 to the peak value of the signal derived from the vertical antenna. When the antennas E—W and N—S are connected to the amplifier, the condenser 11 is charged to the peak value of the signals desired from one or the other of the horizontal antennas, whichever is greater. During the time when the condenser 11 is not connected to the rectifier 5, the switch 13 is actuated to connect the condenser 11 to one circuit of the ratio meter 15. Similarly, the condenser 9 is connected to the other circuit of the meter 15 during the half of the time it is disconnected from the rectifier 5. Thus the two circuits of the meter 15 are energized alternately and for equal intervals by the discharges of the respective condensers, and the moving element of the meter, because of its inertia, integrates the opposing torques to give an average deflection, indicating the ratio of the maximum value of the signal picked up by the vertical antenna. Since the vertical antenna is responsive only to vertically polarized radiation, and the horizontal antennas are responsive only to horizontally polarized radiation, the indicated signal ratio is equal to the ratio of the vertical electric field component to the horizontal electric field component, when either one of the horizontal dipoles is broadside to the wave front. Thus the indication of the meter 15 is correct for four different azimuths, and in error by varying amounts up to about 30 percent for intermediate directions.

To avoid errors caused by the directivities of the individual horizontal dipoles, the system shown in Fig. 2 may be employed. The N—S and E—W antennas are connected respectively to the orthogonally related stator windings 27 and 29 of a goniometer 33. The rotor 31 is mechanically connected to the motor 23.

The operation of the system of Fig. 2 is substantially the same as that of Fig. 1, with the exception that the amplitude of the total horizontally polarized field is derived rather than the larger of two components. The effect of using the goniometer 31 is substantially the same as would be achieved by employing a single horizontal dipole and rotating it rapidly about a vertical axis. The goniometer output is modulated at the frequency of rotation with modulation peaks which are independent in amplitude of the azimuth of wave arrival. The speed of goniometer rotation should be selected to avoid beats between the signal modulation and that introduced by the goniometer.

Fig. 3 shows a system like that of Fig. 2 except for the indicator. A cathode ray tube 35 has its vertical deflection circuit connected to the output of the amplifier 3, and its horizontal deflection circuit connected through a reversing switch 37 to a direct current source 39. The reversing switch is ganged with the switch 33. An attenuator 41 may be included in the circuit of the vertical antenna.

In the operation of the system, the switch 37 applies the potential of the source 39 in alternate polarities to the horizontal deflection circuit of the cathode ray tube 35, displacing in opposite directions the vertical traces produced by the two signal components. The resulting pattern on the screen of the cathode ray tube is illustrated in Fig. 4, where the length of the trace 43 indicates the amplitude of the horizontal electric field component, and the trace 45 indicates the vertical component. The attenuator 41 may be adjusted to cause the traces 43 and 45 to appear of equal lengths at some predetermined ratio of horizontal component to vertical component. The ratio to be selected depends upon the susceptibility to horizontal polarization error of the particular direction finder with which the warning device is used.

The antenna systems shown in Figs. 1, 2 and 3 are particularly suitable if the warning system is to be employed in connection with a direction finder with spaced vertical antennas, such as an Adcock system, which responds properly to electrically vertically polarized waves only. If the direction finder antenna system comprises a horizontal loop or a system of such loops 2, 4, 6 which responds to magnetically vertically polarized waves, orthogonal loops, arranged as shown in Fig. 5, should be substituted for the electric dipoles. A small loop is a magnetic dipole and responds to the magnetic component of a radiation field in the same manner as an electric dipole responds to the electric component.

Each of the systems described above responds to a horizontal field component of one type only, either electric or magnetic, but fails to distinguish between two modes of origin of this horizontal component. Such a component may result from polarization of the wave perpendicular to its vertical plane of incidence, or from the forward tilt of the wave front of a down-coming wave polarized parallel to its vertical plane of incidence.

Under some circumstances, it is desirable to distinguish between the two conditions, because a very steeply tilted or vertically arriving wave can carry little or no useful bearing information, while a wave polarized perpendicular to its plane of incidence may arrive at a definite azimuth which may be determined by a direction finder of suitable type.

By using both a vertical electric dipole and a vertical magnetic dipole, and comparing their outputs with that of an antenna responsive to horizontal polarization, more complete information as to elevation of arrival and type of polarization may be obtained. Referring to Fig. 6, orthogonal horizontal electric dipoles N—S and E—W are connected to a goniometer 53, which may be, for example, of the electronic type described in United States Patent No. 2,208,378 which issued to David G. C. Luck and is assigned to the same assignee as the instant application. An oscillator 55 is provided for controlling the device 53, as described in the Luck patent. A vertical electric dipole V—V and a vertical magnetic dipole (horizontal loop) H are also provided. A plurality of keying amplifiers 47, 49 and 51 are connected to a three phase oscillator 69 so as to operate cyclically and sequentially. The output of the goniometer 53 is connected to the keying amplifier 47, and the dipoles V—V and H are connected to the keying amplifiers 49 and 51, respectively. The outputs of all of the keying devices are connected through an amplifier 57 to the horizontal deflection circuit of a cathode ray tube 59. A direct current source 61 is connected through an electronic switch 67, to the vertical deflection circuit of the cathode ray tube 59. The switch 67 is connected to the oscillator 69 to be controlled thereby, as illustrated by Fig. 8, so as to connect the source 61 to the tube 59 in one polarity when the amplifier 49 is operating, in the opposite polarity when the amplifier 51 is operating, and to disconnect the source 61 from the tube 59 when the amplifier 47 is operating.

The operation of the system of Fig. 6 is substantially like that of Fig. 3, with the exception that electronic pattern rotation and switching is employed, and the additional vertical dipole H is included. Typical indications on the screen of the cathode ray tube are illustrated in Fig. 7. The length of the trace 71 represents the amplitude of the output of the vertical dipole V—V, and the outputs of the horizontal array N—S, E—W, and the vertical magnetic dipole H are represented similarly by the traces 73 and 75, respectively. The information which may be obtained by comparison of the lengths of the traces 71, 73 and 75 is shown by the following table, which indicates only the limiting conditions. The words in the boxes indicate the relative lengths of the respective traces on the cathode ray tube.

| Polarization and elevation of arrival | Vert. Elec. dipole (71) | Horiz. Elec. dipole (73) | Vert. Mag. dipole (75) |
| --- | --- | --- | --- |
| Vertically incident | None | Some | None. |
| Electric field polarized parallel to vertical plane of incidence (vertical polarization) moderate elevation. | Longer | Shorter | Do. |
| Electric field polarized perpendicular to vertical plane of incidence (horizontal polarization) moderate elevation. | None | Comparable | Comparable. |

Thus the operator may observe the cathode ray tube and estimate at any time the probability of error of a bearing taken under the conditions existing at that time. If the center trace 73 is longer than either of the traces 71 and 75, he should not rely on the bearing indication, if any is obtained. If the trace 71 is longer than either of the others, a bearing taken with an Adcock type direction finder using spaced vertical electric antennas is likely to be correct. If the trace 75 is equal to or longer than the trace 71, there is likelihood of error with the vertical electric system.

On the other hand, if a spaced loop type of direction finder is used, the trace 75 should be longer than either of the others for best results.

Thus the invention has been described as a system for deriving separate signal voltages, proportional respectively to the vertical and horizontal components, either electrical or magnetic, of a radiation field. These voltages are employed to actuate an indicator, affording a comparison of their amplitudes to determine the suitability of the signal for the purpose of direction finding.

I claim as my invention:

1. A warning system for radio direction finders including orthogonally related horizontal dipole antennas, a vertical antenna, a voltage responsive indicator, and switching means arranged to cyclically and successively effectively connect said antennas to said indicator.

2. A warning device for radio direction finders including a plurality of mutually orthogonal dipoles, peak voltage amplitude responsive means, and periodic switching means arranged to connect effectively said dipoles successively to said indicating means, whereby said indicating means is actuated in one sense in response to the output of one of said dipoles, and in another sense in response to the resultant output of the others of said dipoles.

3. A warning system for radio direction finders including an antenna system providing non-directional response to waves with one type of polarization perpendicular to the plane of their incidence, a second antenna system providing non-directional response to waves with said one type of polarization parallel to their plane of incidence, a third antenna system providing non-directional response to waves with another type of polarization parallel to their plane of incidence; peak voltage amplitude responsive indicating means, and periodic switching means arranged to connect said antenna systems selectively and successively to said indicating means.

4. A warning system for radio direction finders including an antenna system providing non-directional response to waves with one type of polarization perpendicular to the plane of their incidence, a second antenna system providing non-directional response to waves with said type of polarization parallel to their plane of incidence, peak voltage responsive indicating means, and periodic switching means arranged to connect said antenna systems selectively and successively to said indicating means.

5. A warning system for radio direction finders including two orthogonally related horizontal dipoles, a goniometer device connected to said dipoles, means for operating said goniometer device continuously so that the output thereof simulates that of a single horizontal dipole rotating about a vertical axis; a vertical antenna system, a peak voltage responsive indicator, and periodic switch means arranged to connect said goniometer device and said vertical antenna system cyclically and successively to said indicator.

6. A warning system for radio direction finders including two horizontal dipoles arranged at right angles to each other, a goniometer connected to said dipoles, means for operating said goniometer to provide an output simulating that of a single horizontal dipole rotating about a central vertical axis, a vertical dipole, an amplifier, periodic switching means arranged to connect said goniometer output and said vertical dipole cyclically and successively to said amplifier, a cathode ray tube provided with orthogonally disposed deflection means, connections between the output of said amplifier and one of said deflection means, and a source of voltage of rectangular wave form connected to the other of said deflection means.

7. The method of determining the suitability of a radio wave for the purpose of direction finding comprising the steps of deriving a plurality of signals from one type of horizontally polarized component of said wave, combining said signals to provide a resultant signal proportional to the magnitude of said component and independent of the direction of arrival of said wave, deriving a signal from the same type of vertically polarized component of said wave, and comparing the magnitude of said last mentioned signal with the amplitude of said resultant signal.

8. The method of determining the suitability of a radio wave for the purpose of direction finding, comprising the steps of deriving a plurality of signals from a horizontally polarized component of said wave and related in their magnitudes to the direction of arrival of said wave, combining said signals to produce a resultant signal proportional to the magnitude of said component and independent of the direction of arrival of said wave, deriving signals from the vertically polarized components of said wave, and comparing the magnitudes of said last mentioned signals with each other and with that of said resultant signals.

DAVID G. C. LUCK.

REFERENCES CITED

The following references are of record in the file of this patent:

UNITED STATES PATENTS

| Number | Name | Date |
|---|---|---|
| 2,282,030 | Busignies | May 5, 1942 |

FOREIGN PATENTS

| Number | Country | Date |
|---|---|---|
| 108,204 | Australia | Aug. 7, 1939 |